(12) United States Patent
Dry

(10) Patent No.: US 9,657,205 B2
(45) Date of Patent: May 23, 2017

(54) ADHESIVE BEADS

(71) Applicant: Carolyn Dry, Winona, MN (US)

(72) Inventor: Carolyn Dry, Winona, MN (US)

(73) Assignee: Carolyn Dry, Winona, MN (US)

( * ) Notice: Subject to any disclaimer, the term of this patent is extended or adjusted under 35 U.S.C. 154(b) by 0 days.

(21) Appl. No.: 14/764,503

(22) PCT Filed: Feb. 3, 2014

(86) PCT No.: PCT/US2014/014492
§ 371 (c)(1),
(2) Date: Jul. 29, 2015

(87) PCT Pub. No.: WO2014/121223
PCT Pub. Date: Aug. 7, 2014

(65) Prior Publication Data
US 2015/0361314 A1    Dec. 17, 2015

Related U.S. Application Data

(60) Provisional application No. 61/849,696, filed on Feb. 1, 2013.

(51) Int. Cl.
| | | |
|---|---|---|
| *C09J 4/04* | (2006.01) |
| *C09J 151/00* | (2006.01) |
| *B01J 13/18* | (2006.01) |
| *C09J 4/00* | (2006.01) |
| *C09J 9/00* | (2006.01) |
| *C09J 11/08* | (2006.01) |
| *C09B 67/02* | (2006.01) |
| *C09B 67/08* | (2006.01) |
| *B01J 13/06* | (2006.01) |
| *C09D 7/12* | (2006.01) |
| *C09J 11/06* | (2006.01) |
| *C08K 5/095* | (2006.01) |
| *C08K 5/09* | (2006.01) |
| *C08K 5/13* | (2006.01) |

(52) U.S. Cl.
CPC ........... *C09J 151/003* (2013.01); *B01J 13/06* (2013.01); *B01J 13/18* (2013.01); *C09B 67/0013* (2013.01); *C09B 67/0097* (2013.01); *C09D 7/1291* (2013.01); *C09J 4/00* (2013.01); *C09J 9/00* (2013.01); *C09J 11/06* (2013.01); *C09J 11/08* (2013.01); *C08K 5/09* (2013.01); *C08K 5/095* (2013.01); *C08K 5/13* (2013.01); *C09J 2205/11* (2013.01); *Y10T 428/2998* (2015.01)

(58) Field of Classification Search
None
See application file for complete search history.

(56) References Cited

U.S. PATENT DOCUMENTS

| | | | |
|---|---|---|---|
| 3,980,627 A * | 9/1976 | McDowell | ............ C08F 120/20 523/176 |
| 4,182,823 A | 1/1980 | Schoenberg | |
| 5,561,173 A | 10/1996 | Dry | |
| 5,660,624 A | 8/1997 | Dry | |
| 5,803,963 A | 9/1998 | Dry | |
| 5,989,334 A | 11/1999 | Dry | |
| 6,261,360 B1 | 7/2001 | Dry | |
| 6,527,849 B2 | 3/2003 | Dry | |
| 7,022,179 B1 | 4/2006 | Dry | |
| 7,811,666 B2 | 10/2010 | Dry | |
| 8,685,513 B1 | 4/2014 | Dry | |
| 8,721,959 B2 | 5/2014 | Dry | |
| 8,877,309 B1 | 11/2014 | Dry | |
| 2008/0277060 A1 * | 11/2008 | Malofsky | ................... C09J 4/00 156/332 |

FOREIGN PATENT DOCUMENTS

| | | |
|---|---|---|
| WO | WO-83/02450 | 7/1983 |
| WO | WO-2007/005657 | 1/2007 |

OTHER PUBLICATIONS

Klemarczyk, P., "The isolation of a zwitterionic initiating species for ethyl cyanoacrylate (ECA) polymerization and the identification of the reaction products between 1°, 2°, and 3° amines with ECA," 2001, Polymer, 42, 2837-2848.

Yang, J. et al., "Microencapsulation of Isocyanates for Self-Healing Polymers," Macromolecules, 2008, 9650-9655.

* cited by examiner

*Primary Examiner* — Satya Sastri
(74) *Attorney, Agent, or Firm* — Foley & Lardner LLP

(57) ABSTRACT

The present technology provides for adhesive beads, comprising a shell and a core wherein the core comprises one or more cyanoacrylate monomers and the shell comprises a polycyanoacrylate of the same one or more cyanoacrylate monomers. The present technology further provides for methods of making and using the adhesive beads.

35 Claims, No Drawings

ADHESIVE BEADS

CROSS REFERENCE TO RELATED APPLICATIONS

This application is a 371 National Phase Application of PCT/US2014/014492, filed Feb. 3, 2014, which claims priority to U.S. Provisional Application 61/849,696, filed Feb. 1, 2013, each of which is incorporated herein by reference in its entirety.

BACKGROUND

Cyanoacrylate adhesives constitute a large class of quick-curing one-part adhesives that polymerize in the presence of even weakly basic species (e.g., moisture) and/or heat to form polycyanoacrylates that bond to many types of surfaces. Cyanoacrylates monomers include an acrylic functionality, usually in the form of an ester, and a cyano group, typically but not exclusively at the 2-position on the acrylate (e.g., $CH_2$=C(CN)C(O)O-alkyl). Both 2- and 3-cyanoacrylates may be substituted at the 3-position and 3-cyanoacrylates may be substituted at the 2 position.

SUMMARY

The present technology provides adhesive beads having a polymeric shell made of the same adhesive monomers contained in the core of the beads. For example, the adhesive beads may contain cyanoacrylate monomers in which the shell of the beads is a polycyanoacrylate formed from the same cyanoacrylate monomers at the core of the beads. In some embodiments, the polymer is selected from one or more of polyacrylates, polycyanoacrylates, epoxies, silicones and polyurethanes. The present technology further provides methods of making and using such beads. Such encapsulation of the adhesive monomers allows pre-coating of surfaces (e.g., screws and fasteners) with adhesives that can be activated at a later time as needed. When produced as microspheres with sub-millimeter diameters, the present adhesive beads advantageously exhibit low density, improved dimensional stability, increased impact strength, smoother surface finish, greater thermal insulation, easier machinability, faster cycle times, and cost savings. The relatively low surface area of the beads when formulated as microspheres allows for higher solids loading and lower impact on viscosity and flow characteristics of compositions containing the adhesive beads. Other advantages of the present beads include the simplicity of a single polymeric system; there is no need to match the shell polymer to the adhesive polymer as both parts are the same. The processes for making the beads is also simplified and does not require additional toxic chemicals, as the processes may be carried out in water with little to no effluent in need of treatment upon completion of the processes. The processes are flexible, allowing one to readily adjust the size of the beads, the monomer composition, the shell thickness and other characteristics such as heat and/or water resistance. Finally, the beads may be prepared inexpensively as additional chemicals for the shell are not needed and standard chemical mixing equipment can be used. The beads themselves have a wide array of applications, including coatings, composites, construction materials, thread locks, herbicides, pesticides, electronics and viewable parts, fiber optics, optical devices, solar cells and collectors, medical and cosmetic applications, and even craft projects.

The foregoing summary is illustrative only and is not intended to be in any way limiting. In addition to the illustrative aspects, embodiments, and features described above, further aspects, embodiments, and features will become apparent by the detailed description.

DETAILED DESCRIPTION

The present technology provides adhesive beads (also known as microcapsules) and methods of making and using such beads/capsules. The beads include a shell and a core. The core includes one or more cyanoacrylate monomers and the shell includes a polycyanoacrylate of the same one or more cyanoacrylate monomers. No other polymer(s) are required to form the shell although mixtures of non-cyanoacrylate based polymers may be employed if desired. For example, the bead may further include a second shell enclosing the polycyanoacrylate shell. The core may include cyanoacrylate oligomers as well as cyanoacrylate monomers. In some embodiments, the core is liquid and the shell is solid.

A wide variety of cyanoacrylate monomers may be used depending on the application at hand. Generally the one or more cyanoacrylate monomers (optionally formulated with viscosity modifying agents) may have a viscosity of about 1 centipoise to about 1000 centipoise. For example, cyanoacrylate monomers (and/or oligomers) may be used having viscosities of about 1, about 5, about 10, about 20, about 30, about 40, about 50, about 75, about 100, about 125, about 150, about 175, about 200, about 300, about 400, about 500, about 600, about 700, about 800, about 900, about 1000 centipoise or any range between and including any two of the foregoing values. Likewise, cyanoacrylate monomers having a range of set times may be used, e.g., about 1 second to about 3 minutes. Thus, the one or more cyanoacrylate monomers may have set times such as about 1, about 2, about 3, about 4, about 5, about 6, about 7, about 8, about 9, about 10, about 15, about 20, about 25, about 30, about 40, about 50, about 60, about 70, about 80, about 90, about 120, about 150, or about 180 seconds or ranges between and including any two of the foregoing set times.

In some embodiments, the cyanoacrylate monomer is a cyanoacrylic acid, and in others it is an ester of cyanoacrylic acid. The cyanoacrylate may be a 2-cyanoacrylate or a 3-cyanoacrylate. The cyanoacrylate may optionally be substituted at the 3-position with one or two groups selected from alkyl, alkenyl, aryl or aralkyl groups or from halogens, amino groups or other substituents. In some embodiments of the beads, the one or more cyanoacrylate monomers are selected from methyl cyanoacrylate, ethyl cyanoacrylate, butyl cyanoacrylate, octyl cyanoacrylate, beta-methoxyethyl cyanoacrylate, or a mixture of any two or more thereof. In certain embodiments, the one or more cyanoacrylate monomers are selected from one or more of methyl 2-cyanoacrylate, ethyl 2-cyanoacrylate, n-butyl 2-cyanoacrylate, 2-octyl 2-cyanoacrylate, 6-methylheptyl 2-cyanoacrylate, fluoroalkyl-2-cyanoacrylate, aryloxy ethyl-2-cyanoacrylate, trimethylsilyl alkyl-2-cyanoacrylate or a mixture of any two or more thereof. Cyanoacrylate adhesives may be prepared by known methods such as using the Knoevenagel condensation and are manufactured and marketed worldwide by various companies including Loctite, a Henkel Company, of Rocky Hill, Conn., SAFE-T-LOC International Corporation of Lombard, Ill., SUR-LOK Corporation of Walworth, Wis., and Elmers Products, of Columbus, Ohio, the manufacturer of the well-known KRAZY GLUE. The ability of cyanoacrylates to rapidly cure and bond to skin makes them particularly well suited for use as medical adhesives. Cyanoacrylate adhesives suitable for use as medical adhesives include octyl 2-cyanoacrylate marketed as DERMABOND, a topical skin adhesive by Ethicon, Inc., a Johnson & Johnson Company, of Somerville, N.J., and butyl cyanoacrylate marketed as VETBOND by World Precision Instruments, Inc. of Sarasota, Fla.

The core of beads of the present technology may also include other monomers, oligomers and polymers. For example, the core may further include one or more of glycidyl acrylate, epichlorohydrin, 3,4-epoxycyclohexylmethyl-3,4-epoxycyclohexane carboxylate, silicon-containing monomers, fluoro-containing monomers, ionizable monomers, and poly(methyl methacrylate). Monomers incorporating silicon or fluoride can improve water-resistance of the cured polycyanoacrylate, while addition of poly(methyl methacrylate) to the cyanoacrylate monomers lowers tensile stiffness, increases deformability and relaxation of the adhesive bond and improves impact resistance. Thus, in some embodiments, the core includes a mixture of about 88 to about 98 wt % of a $C_{1-8}$ alkyl 2-cyanoacrylate or a $C_{2-8}$ alkenyl 2-cyanoacrylate, about 2 to about 10 wt % poly(methyl methacrylate), about 0.1 to about 2 wt % hydroquinone and/or a sulfonic acid.

The core of beads of the present technology may also include one or more additives selected from a filler, stabilizer, viscosity modifier, colorant, rubberizer, odorant, plasticizer, acid, or any combination of two or more thereof. It will be understood by those skilled in the art that the additives may also be present in the shell. Fillers are materials that may be added to the cyanoacrylate monomers to improve strength, toughness, flexibility or other properties of the cured or uncured adhesive. Fillers may include, without limitation, fibers or particles, such as polymer, metal, glass or carbon fibers or particles, magnetic particles, carbon nanotubes, carbon black, silicas, nanoparticles and nanoflakes, or any combination of two or more thereof.

Stabilizers may be added to the cyanoacrylate monomers to improve their shelf-life and/or heat resistance by preventing premature polymerization. The stabilizers include without limitation, free radical stabilizers (e.g., hydroquinone, BHA (butylated hydroxyanisole), BHT (butylated hydroxytoluene)), and anionic stabilizers (e.g., protonic acids, Lewis acids, and anhydrides, such as, without limitation, phthalic anhydride, maleic anhydride and itaconic anhydride). Acids, may be added in either gaseous or liquid form, to the monomers in the core to inhibit polymerization. In some embodiments, the acid comprises a mineral acid, a sulfonimide, an alkyl carboxylic acid, an aryl carboxylic acid, a perfluorocarboxylic acid, a halogenated phenol, a perfluoroalcohol, $RSO_3H$, or $(R'SO_2)_2NH$; where R and R' are independently selected from the group consisting of alkyl, alkenyl, aryl, heteroaryl, perfluoroalkyl, and perfluoroarylakyl. In certain embodiments, the acid is selected from HCl, HF, HBr, $H_2SO_4$, $H_3PO_4$, $HNO_3$, perchloric acid, acetic acid, chloroacetic acid, cyanoacetic acid, formic acid, benzoic acid, bis(trifluoromethane)sulfonimide, nitric oxide, carbon dioxide, sulfur dioxide, chlorophenol, trifluroacetic acid, pentafluoropropionic acid, ethanesulfonic acid, toluenesulfonic acid, methane sulfonic acid, trifluoromethanesulfonic acid, fluorosulfonic acid, chlorosulfonic acid, nitrobenzenesulfonic acid, dinitrobenzenesulfonic acid, bromobenzenesulfonic acid, chlorobenzenesulfonic acid, benzenesulfonic acid, ethylbenzenesulfonic acid, 2-mesitylenesulfonic acid, p-xylene-2-sulfonic acid, naphthalenesulfonic acid or any combination of two or more thereof. In some embodiments, the concentration of acid used can be from about 10 ppm to about 1000 ppm, Examples of acid concentrations that may be used include 10, 25, 50, 75, 100, 150, 200, 300, 400, 500, 600, 700, 800, 900, and 1000 ppm or ranges between and including any two of the foregoing values. Generally, lower concentrations of a stronger acid such as 20-100 ppm $H_3PO_4$ may be used, while higher concentrations of weaker acids may be necessary (e.g., 100-500 ppm acetic or benzoic acid).

Viscosity modifiers are chemicals used to adjust the viscosity of the cyanoacrylates, e.g., to make them flow more or less readily. Viscosity modifiers may include polylactic acid, fumed silica, and oligomers or polymers of ethyl 2-cyanoacrylate. Similarly, platicizers may be added to the monomer compositions to improve the plasticity and decrease the rigidity of the cured polycyanoacrylate. Non-limiting examples of plasticizers include aryl and diaryl ethers, dioctyl phthalate, and glycerol triacetate.

Colorants may be added to the core, such as dyes or pigments to allow easier visualization of the beads before or after they release the cyanoacrylate monomers. Non limiting examples of colorants include food colors, bromocresol purple, bromocresol green, bromothymol blue, and sulforhodamine B. pH indicators and other colorants that change color in response to changes in environmental conditions may also be used. For example, when the adhesive is released from the beads, bromocresol purple, bromocresol green, bromothymol blue may be used to indicate that the adhesive has polymerized, Rubberizers are agents which impart elastomeric, i.e., rubbery, qualities to the cured cyanoacrylate. Non-limiting examples include acrylic rubbers (e.g., as disclosed in WO/1983/002450) such as acrylonitrile-butadiene copolymer and the like.

The beads may have a variety of shapes and sizes. The shape of the beads ranges from generally spherical, to ovoid or even tubular, and may be symmetrical, asymmetrical, regular or irregular. The beads may have a diameter or cross-section ranging from about 100 μm to about 3000 μm. Examples of bead diameters include about 100, about 200, about 300, about 400, about 500, about 600, about 700, about 800, about 900, about 1000, about 1500, about 2000, about 2500, or about 3000 microns or a range between and including any two of these sizes. The shell of the bead may have a thickness from about 1 μm to about 150 μm. Exemplary shell thicknesses include about 1, about 2, about 3, about 4 about 5, about 10, about 15, about 20, about 25, about 30, about 40, about 50, about 75, about 100, about 125 or about 150 μm or a range between and including any two of the foregoing values. Thus, the shell thickness and composition of the beads may be configured to allow the beads to release their contents upon impact and/or heating and/or upon exposure to radiation.

Beads of the present technology may be employed in a variety of applications. For example, compositions may be prepared that include the present breads and a liquid, a paint or other coating. The beads may be coated on or incorporated into various articles such as fasteners (e.g., thread locks for a screw, bolt or nut), a medical device, a construction material or a construction plenum. They may be used as an embolization agent to bind wounds and stop bleeding. Additional examples of applications for the present beads include as tiling adhesives, PVC pipe adhesives, assembly adhesives, contact adhesives, flooring installation adhesives, glue sticks, correction products, adhesive tapes, wood adhesives, structural adhesives, packaging adhesives, and laminating adhesives. The beads may also be used to temporarily hold a workpiece to a mount. The beads may also be used in or as herbicides, pesticides, electronics and viewable parts, fiber optics, optical devices, solar cells and collectors, medical and cosmetic applications, and even craft projects. The cyanoacrylate monomer compositions may be adjusted as known in the art to be curable by heat, light or radiation, including microwave heating.

The present beads may also be used in self-repairing composites that include a matrix polymer and a plurality of beads of the present technology. The matrix polymer may be selected from the group consisting of thermosetting resins, thermoplastics, and elastomers as well as mixtures of two or more thereof. Exemplary matrix polymers include olefinics, vinylics, styrenics, acrylonitrilics, acrylics, polyacrylates, polycarbonates, polyalloys, cellulosics, polyamides, polyaramids, thermoplastic polyesters and copolyesters, polyethers, phenol-formaldehydre resins, amine-formaldehyde resins, poly(acrylonitrile-butadiene-styrene), polyurethanes including foaming polyurethanes, polyolefins, polysilanes, sulfones and polysulfbnes, polyimides and imide polymers, ether-oxide polymers, ketone polymers, fluoropolymers, and heterochain polymers, and the like. Additional examples of thermosetting resins include, for example, epoxy systems (both one-part and two-part systems), formaldehyde systems, urethane/urea systems, formaldehyde systems, furan systems, allyl systems, alkyd systems, unsaturated polyester systems, vinyl ester systems, and the like. Epoxy systems include cycloaliphatic, epoxies, diglycidyl ether of bisphenol-A or its brominated versions, tetraglycidyl methylene dianiline, polynuclear phenol epoxy, epoxy phenol novolac, epoxy cresol novolac, hydantoin epoxies, and so forth. Epoxy resin systems can be processed in a variety of manners and can be cured at low or elevated temperatures. Formaldehyde systems include urea-formaldehydes, phenol formaldehydes, and melamine formaldehydes.

Elastomers that can be used as matrix polymers include vulcanizable elastomers, reactive system elastomers and thermoplastic elastomers. Examples of such elastomers include dime and related polymers, elastomeric copolymers, ethylene-related elastomers, fluoroelastomers, silicone polymers, and thermoplastic elastomers. Thermoplastic elastomers can include rubbery polymers and copolymers including, for example without limitation, styrenebutadiene rubber (SBR), neoprene, EDM and silicone rubbers and the like.

Examples of thermosetting materials that can be used as a matrix with the self-repair system include acrylates, methacrylates, cyanoacrylate resins, epoxy resins, phenoplasts such as phenolic resins, aminoplasts such as melamineformaldehydes, unsaturated polyester resins, vinyl ester resins, polyurethanes, and so forth.

In some medical applications, the cyanoacrylate monomers may be mixed with medicaments and additives to allow escape of the medicament from the cured polycyanoacrylate. Cyanoacrylic esters form a dense structure after solidification which inhibits the penetration of medicaments contained within the adhesive into blood or tissues. Controlled release of medicaments from cyanoacrylate adhesives is typically achieved by one or more of the following routes: 1) biodegradation of cyanoacrylates in the presence of enzymes from blood or tissues around wound where the antiseptic glues are applied; 2) surface roughness or voids caused by non-uniform coating of adhesives to the wound; and 3) through artificially introduced defects in the adhesive matrix by mixing certain hydrophilic materials into the adhesive. When water comes in contact with the hydrophilic materials in the adhesive matrix, the materials are dissolved into the water and leave passages behind. These passages facilitate the controlled release of medicaments by allowing water to pass through the polycyanoacrylate (i.e., the adhesive matrix).

In some embodiments, controlled release of medicaments from the adhesive matrix is primarily achieved through the use of artificially introduced defects or pores. Such defects may be induced using water-soluble salts, such as sodium chloride in powder form. However, in certain embodiments, polyethylene glycol (PEG) is added to the adhesive to form defects that provide passage to microencapsulated medicaments in the adhesive matrix, thereby increasing the releasing rate of the medicaments in the solidified adhesive film. PEG is generally preferred over water-soluble salts in that it yields a more homogeneous blend with cyanoacrylate adhesives than do water soluble salts such as sodium chloride.

Defects or passages for medicament release from a solidified adhesive film or matrix are preferably provided by adding PEG with an average molecular weight of 600 to the cyanoacrylate adhesive. While polyethylene glycol is the preferred defect-forming agent, defects may also be formed by adding any suitable hydrophilic material to cyanoacrylate adhesive. Suitable hydrophilic materials include, but are not limited to, water soluble or water miscible polymers, water soluble salts, water soluble small molecules, water soluble natural products, mixtures and combinations thereof, and the like.

In another aspect, the present technology provides methods of preparing the beads described herein. The methods include adding a base to a heterogeneous mixture comprising one or more cyanoacrylate monomers and a fluid in which the one or more cyanoacrylate monomers are substantially insoluble. By "substantially insoluble" is meant that little if any of the cyanoacrylate monomers dissolve in the fluid (e.g., less than 3 wt %, less than 2 wt % or less than 1 wt %, less than 0.5 wt %, less than 0.1 wt %). In some embodiments, the heterogenous mixture includes droplets of the cyanoacrylate monomers (e.g. in the form of an emulsion), optionally including an acid and/or other stabilizer. Upon addition of the base, the beads form, each one comprising a shell surrounding a core, wherein the core comprises the cyanoacrylate monomers, and the shell comprises a polymer of the same cyanoacrylate monomers. The core may include cyanoacrylate oligomers, e.g., oligomers formed from the same cyanoacrylate monomers.

The fluid may be water or an organic solvent so long as the cyanoacrylate monomers are substantially insoluble in the fluid. For example, the organic solvent may be selected from pentane, hexanes, xylene, toluene, ethyl ether, methyl t-butyl ether or a combination of any two or more thereof. The heterogenous mixture may contain an acid, such as any of the ones or mixtures of ones described herein. The base is typically an aqueous solution that includes hydroxide, amine (e.g., methyl amine), acetate, formate, benzoate, bisulfate, fluoride, monobasic phosphate, dibasic phosphate, pyridine, ammonia or a mixture of any two or more thereof. The methods may include quenching the bead formation by adding enough acid to lower the pH to about 7 or below. While not wishing to bound by theory, it is believed that upon addition of the base, the surface of the droplets of cyanoacrylate begin polymerizing. Before the droplets can completely polymerize, an acid quench neutralizes the base and terminates the polymerization. The thickness of the shell may be controlled by varying the concentration of base added (i.e., the pH), the concentration of the acid quench, the time before the reaction is quenched and the reactivity of the cyanoacrylate monomer. Thicker shells may be obtained at higher base concentrations or longer time periods before quench or with more reactive cyanoacrylate monomers. The speed and extent of polymerization may also be controlled by adjusting the temperature of the heterogeneous mixture, particularly in cooling the mixture to a temperature from about 5° to about 15° C.

In some embodiments of the methods, the heterogeneous mixture includes a filler and/or one or more additives as described above. In some embodiments, the heterogeneous mixture comprises a surfactant such as, without limitation, lauryl sulfate or sulfonate, toluene sulfonic acid, and the like. To avoid premature polymerization, the equipment used to prepare the beads may be washed with acid and dried prior to charging the equipment with the heterogeneous mixture. Any of the monomers described herein, including any cyanoacrylate monomer, may be used to prepare the beads, including those with a viscosity from about 1 centipoise to about 100, and those with set times from about 1 second to about 3 minutes. In some embodiments, the viscosity of the monomers may be adjusted to at least 20 or at least 30 centipoise with a viscosity modifier (e.g., thickener).

In other embodiments, the methods may include forming droplets of an cyanoacrylate monomer in air, the droplets optionally comprising an acid, and coating the droplets with an alkaline aqueous solution to form a bead comprising a polymeric shell surrounding a core, wherein the core comprises the cyanoacrylate monomer and the acid. In still other embodiments, the methods include extruding one or more cyanoacrylate monomers into an alkaline solution and adjusting the pH to at or below 7 to form an extrudate comprising a shell of polycyanoacrylate surrounding a core, wherein the core comprises the one or more of the cyanoacrylate monomers described herein.

The following terms are used throughout the present disclosure as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as hydroxyl, amino, halo, thio, oxo, carboxy, etc., and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Alkenyl groups include straight and branched chain alkyl groups as defined above, except that at least one double bond exists between two carbon atoms. Alkenyl groups have from 2 to 12 carbon atoms, and typically from 2 to 10 carbons or, in some embodiments, from 2 to 8, 2 to 6, or 2 to 4 carbon atoms. In some embodiments, the alkenyl group has one, two, or three carbon-carbon double bonds. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above for alkyl.

Aryl groups are cyclic aromatic hydrocarbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above for alkyl.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above for alkyl groups.

Heterocyclyl groups include aromatic (also referred to as heteroaryl) and non-aromatic ring compounds containing 3 or more ring members, of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these are referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl(pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl(azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl(pyrrolopyridinyl), indazolyl, benzimidazolyl, imidazopyridinyl(azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Substituted heterocyclylalkyl groups may be substituted at the alkyl, the heterocyclyl or both the alkyl and heterocyclyl portions of the group. Representative heterocyclyl alkyl groups include, but are not limited to, morpholin-4-yl-ethyl, furan-2-yl-methyl, imidazol-4-yl-methyl, pyridin-3-yl-methyl, tetrahydrofuran-2-yl-ethyl, and indol-2-yl-propyl. Representative substituted heterocyclylalkyl groups may be substituted one or more times with substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

EXAMPLES

The present technology will now be further described by way of the following examples. All parts, ratios, percents and amounts stated in the Examples are by weight unless otherwise specified.

In the following examples, all ratios and percentages are by weight unless otherwise indicated.

Example 1: Preparation of Adhesive Beads Via Addition of Adhesive Monomer Mixture to Water Using Weak Base and Acid One hundred mL water was added to a 250 mL beaker with stirring. With the tip of the dispenser below the surface of the water, about 10 drops of adhesive monomer mixture was added to the stirred water. The droplets were clearly visible in the water. After 10-20 seconds, 4 mL of the 0.5 M $Na_2HPO_4$ were quickly added to the stirred mixture, followed shortly by 1.2 mL of acetic acid. The mixture was stirred for about an additional 15 seconds until the beads formed and could be removed from solution via a pipette or filtration. The beads contain liquid monomer mixtures inside and are not tacky on the outside. Table 1 lists the various adhesive monomer mixtures that were used to form beads by this method. Of the cyanoacrylate compositions in the table, those with higher viscosities (i.e., >10) more reliably formed adhesive beads.

TABLE 1

| Adhesive Monomers and Additives | Viscosity of Adhesive Mixture | Set Time |
|---|---|---|
| 95-100 wt % Ethyl 2-cyanoacrylate, 3-5 wt % poly(methyl methacrylate), 0.3-0.5 wt % hydroquinone | 29 cps | 5-10 seconds |
| 60-100 wt % Ethyl 2-cyanoacrylate, 5-10 wt % proprietary thickener | 100 cps | 5-10 seconds |
| 95-100 wt % Proprietary cyanoacrylate ester, 0.1-3 wt % proprietary cyanoacetate ester, 3-5 wt % poly(methyl methacrylate), 0.1-0.5 wt % hydroquinone | 50 cps | 5-10 seconds |
| Ethyl 2-cyanoacrylate, poly(methyl methacrylate), hydroquinone | 10-30 cps | 3-20 seconds |

Example 2: Preparation of Adhesive Beads Via Addition of Adhesive Monomer Mixture to Water Using Strong Acid and Weak Base The procedure of Example 1 is followed, except that muriatic acid (20% HCl) is used in place of acetic acid, producing smaller diameter beads.

Example 3: Paint Incorporating Adhesive Beads

Ethyl 2-cyanoacrylate beads of about 500 microns or less in diameter were prepared according the procedure of Example 2, except that a 50% solution of NaOH in water was used as the base. About 20-30 wt % of beads were gently mixed into a commercially available white latex wall paint. After drying, the surface of the paint was sliced with a knife to simulate a scratch. Adhesive monomer flowed from the beads to fill the slice and quickly cured to provide a colorless repair of the slice.

What is claimed is:
1. A bead comprising a shell and core wherein
   the core comprises one or more cyanoacrylate monomers and an acid, wherein the acid comprises a mineral acid, a sulfonimide, an alkyl carboxylic acid, an aryl car- boxylic acid, a perfluorocarboxylic acid, a halogenated phenol, a perfluoroalcohol, $RSO_3H$, or $(R'SO_2)_2NH$; where R and R' are independently selected from the group consisting of alkyl, alkenyl, aryl, heteroaryl, perfluoroalkyl, and perfluoroarylakyl, and the shell comprises a polycyanoacrylate of the same one more cyanoacrylate monomers, wherein the one or more cyanoacrylate monomers are selected from methyl cyanoacrylate, ethyl cyanoacrylate, butyl cyanoacrylate, octyl cyanoacrylate, beta-methoxyethyl cyanoacrylate, or a mixture of any two or more thereof.

2. The bead of claim 1, wherein the core is liquid and the shell is solid.

3. The bead of claim 1, wherein the one or more cyanoacrylate monomers have a viscosity of 1 centipoise to 1000 centipoise.

4. The bead of claim 1, wherein the one or more cyanoacrylate monomers have set times from 1 second to 3 minutes.

5. The bead of claim 1, wherein the core further comprises one or more of glycidyl acrylate, epichlorohydrin, 3,4-epoxycyclohexylmethyl-3,4-epoxycyclohexane carboxylate, silicon-containing monomers, fluoro-containing monomers, ionizable monomers, and poly(methyl methacrylate).

6. The bead of claim 1, comprising one or more additives selected from a filler, stabilizer, viscosity modifier, colorant, rubberizer, odorant, plasticizer, or any combination of two or more thereof.

7. The bead of claim 6, wherein the filler comprises polymer, metal, glass or carbon fibers or particles, magnetic particles, carbon nanotubes, carbon black, silicas, nanoparticles, nanoflakes, or any combination of two or more thereof.

8. The bead of claim 1, wherein the acid comprises HCl, HF, HBr, $H_2SO_4$, $H_3PO_4$, $HNO_3$, perchloric acid, acetic acid, chloroacetic acid, cyanoacetic acid, formic acid, benzoic acid, bis(trifluoromethane)sulfonimide, chlorophenol, trifluroacetic acid, pentafluoropropionic acid, ethanesulfonic acid, toluenesulfonic acid, methane sulfonic acid, trifluoromethanesulfonic acid, fluorosulfonic acid, chlorosulfonic acid, nitrobenzenesulfonic acid, dinitrobenzenesulfonic acid, bromobenzenesulfonic acid, chlorobenzenesulfonic acid, benzenesulfonic acid, ethylbenzenesulfonic acid, 2-mesitylenesulfonic acid, p-xylene-2-sulfonic acid, naphthalenesulfonic acid or any combination of two or more thereof.

9. The bead of claim 1, wherein the bead has a diameter ranging from 100 μm to 3000 μm.

10. The bead of claim 1, wherein the shell has a thickness in a range from 1 μm to 150 μm.

11. A composition comprising the bead of claim 1 and a liquid, a paint, or a coating.

12. An article comprising the bead of claim 1, wherein the article is selected from a fastener, a medical device, a construction material or a construction plenum.

13. A composite comprising a matrix polymer and a plurality of the beads of claim 1.

14. The composite of claim 13 wherein the matrix polymer is selected from the group consisting of thermosetting resins, thermoplastics, and elastomers.

15. A method of preparing a bead of claim 1 comprising:
adding a base to a heterogeneous mixture comprising the one or more cyanoacrylate monomers, the acid, and a fluid in which the one or more cyanoacrylate monomers are substantially insoluble, and
forming a bead comprising the shell surrounding the core.

16. The method of claim 15, wherein the fluid is water or an organic solvent selected from pentane, hexanes, xylene, toluene, ethyl ether, methyl t-butyl ether or a combination of any two or more thereof.

17. The method of claim 15, wherein the base is an aqueous solution comprising hydroxide, amine, acetate, formate, benzoate, bisulfate, fluoride, monobasic phosphate, dibasic phosphate, pyridine, ammonia, or methylamine.

18. The method of claim 15, comprising quenching the bead formation by adding enough acid to lower the pH to 7 or below.

19. The method of claim 15, comprising cooling the heterogeneous mixture to a temperature from 5° to 15° C.

20. The method of claim 15, wherein the heterogeneous mixture comprises filler and/or one or more additives.

21. The method of claim 15, wherein the heterogeneous mixture comprises surfactant.

22. The method of claim 15, wherein the one or more cyanoacrylate monomers have set times from 1 second to 3 minutes.

23. A method of preparing the bead of claim 1 comprising:
forming droplets of the one or more cyanoacrylate monomers and/or oligomer in air, the droplets comprising the acid, and
coating the droplets with an alkaline aqueous solution to form the bead.

24. The method of claim 15, wherein the viscosity of the one or more cyanoacrylate monomers is from 1 centipoise to 1000 centipoise.

25. The method of claim 15 comprising forming the heterogenous mixture by adding the one or more cyanoacrylate monomers and/or oligomers to water, below the surface of the water.

26. The method of claim 15, wherein the core of the bead is liquid and the shell of the bead is solid.

27. The method of claim 15, wherein the acid comprises HCl, HF, HBr, $H_2SO_4$, $H_3PO_4$, $HNO_3$, perchloric acid, acetic acid, chloroacetic acid, cyanoacetic acid, formic acid, benzoic acid, bis(trifluoromethane)sulfonimide, chlorophenol, trifluroacetic acid, pentafluoropropionic acid, ethanesulfonic acid, toluenesulfonic acid, methane sulfonic acid, trifluoromethanesulfonic acid, fluorosulfonic acid, chlorosulfonic acid, nitrobenzenesulfonic acid, dinitrobenzenesulfonic acid, bromobenzenesulfonic acid, chlorobenzenesulfonic acid, benzenesulfonic acid, ethylbenzenesulfonic acid, 2-mesitylenesulfonic acid, p-xylene-2-sulfonic acid, naphthalenesulfonic acid or any combination of two or more thereof.

28. The method of claim 23, wherein the core of the bead is liquid and the shell of the bead is solid.

29. The method of claim 23, wherein the acid comprises HCl, HF, HBr, $H_2SO_4$, $H_3PO_4$, $HNO_3$, perchloric acid, acetic acid, chloroacetic acid, cyanoacetic acid, formic acid, benzoic acid, bis(trifluoromethane)sulfonimide, chlorophenol, trifluroacetic acid, pentafluoropropionic acid, ethanesulfonic acid, toluenesulfonic acid, methane sulfonic acid, trifluoromethanesulfonic acid, fluorosulfonic acid, chlorosulfonic acid, nitrobenzenesulfonic acid, dinitrobenzenesulfonic acid, bromobenzenesulfonic acid, chlorobenzenesulfonic acid, benzenesulfonic acid, ethylbenzenesulfonic acid, 2-mesitylenesulfonic acid, p-xylene-2-sulfonic acid, naphthalenesulfonic acid or any combination of two or more thereof.

30. The method of claim 23, wherein the one or more cyanoacrylate monomers have set times from 1 second to 3 minutes.

31. The method of claim 23, wherein the viscosity of the one or more cyanoacrylate monomers is from 1 centipoise to 1000 centipoise.

32. The bead of claim 1, wherein
the acid comprises HCl, HBr, $H_2SO_4$, $H_3PO_4$, or any combination of two or more thereof; and
the one or more cyanoacrylate monomers includes at least ethyl 2-cyanoacrylate.

33. A bead comprising a shell and core wherein
the core comprises one or more cyanoacrylate monomers and an acid, wherein the acid comprises a mineral acid, a sulfonimide, an alkyl carboxylic acid, an aryl carboxylic acid, a perfluorocarboxylic acid, a halogenated phenol, a perfluoroalcohol, $RSO_3H$, or $(R'SO_2)_2NH$; where R and R' are independently selected from the group consisting of alkyl, alkenyl, aryl, heteroaryl, perfluoroalkyl, and perfluoroarylakyl, and
the shell comprises a polycyanoacrylate of the same one more cyanoacrylate monomers,
wherein the one or more cyanoacrylate monomers is selected from one or more of methyl 2-cyanoacrylate, ethyl 2-cyanoacrylate, n-butyl 2-cyanoacrylate, 2-octyl 2-cyanoacrylate, 6-methylheptyl 2-cyanoacrylate, fluoroalkyl-2-cyanoacrylate, aryloxy ethyl-2-cyanoacrylate, trimethylsilyl alkyl-2-cyanoacrylate or a mixture of any two or more thereof.

34. A bead comprising a shell and core wherein
the core comprises one or more cyanoacrylate monomers and an acid, wherein the acid comprises a mineral acid, a sulfonimide, an alkyl carboxylic acid, an aryl carboxylic acid, a perfluorocarboxylic acid, a halogenated phenol, a perfluoroalcohol, $RSO_3H$, or $(R'SO_2)_2NH$; where R and R' are independently selected from the group consisting of alkyl, alkenyl, aryl, heteroaryl, perfluoroalkyl, and perfluoroarylakyl, and
the shell comprises a polycyanoacrylate of the same one more cyanoacrylate monomers,
a second shell enclosing the shell, wherein the second shell comprises a polymer other than cyanoacrylate.

35. The bead of claim 33, wherein the one or more cyanoacrylate monomers is selected from one or more of methyl 2-cyanoacrylate, ethyl 2-cyanoacrylate, n-butyl 2-cyanoacrylate, 2-octyl 2-cyanoacrylate, 6-methylheptyl 2-cyanoacrylate, fluoroalkyl-2-cyanoacrylate, aryloxy ethyl-2-cyanoacrylate, trimethylsilyl alkyl-2-cyanoacrylate or a mixture of any two or more thereof.

* * * * *